UNITED STATES PATENT OFFICE.

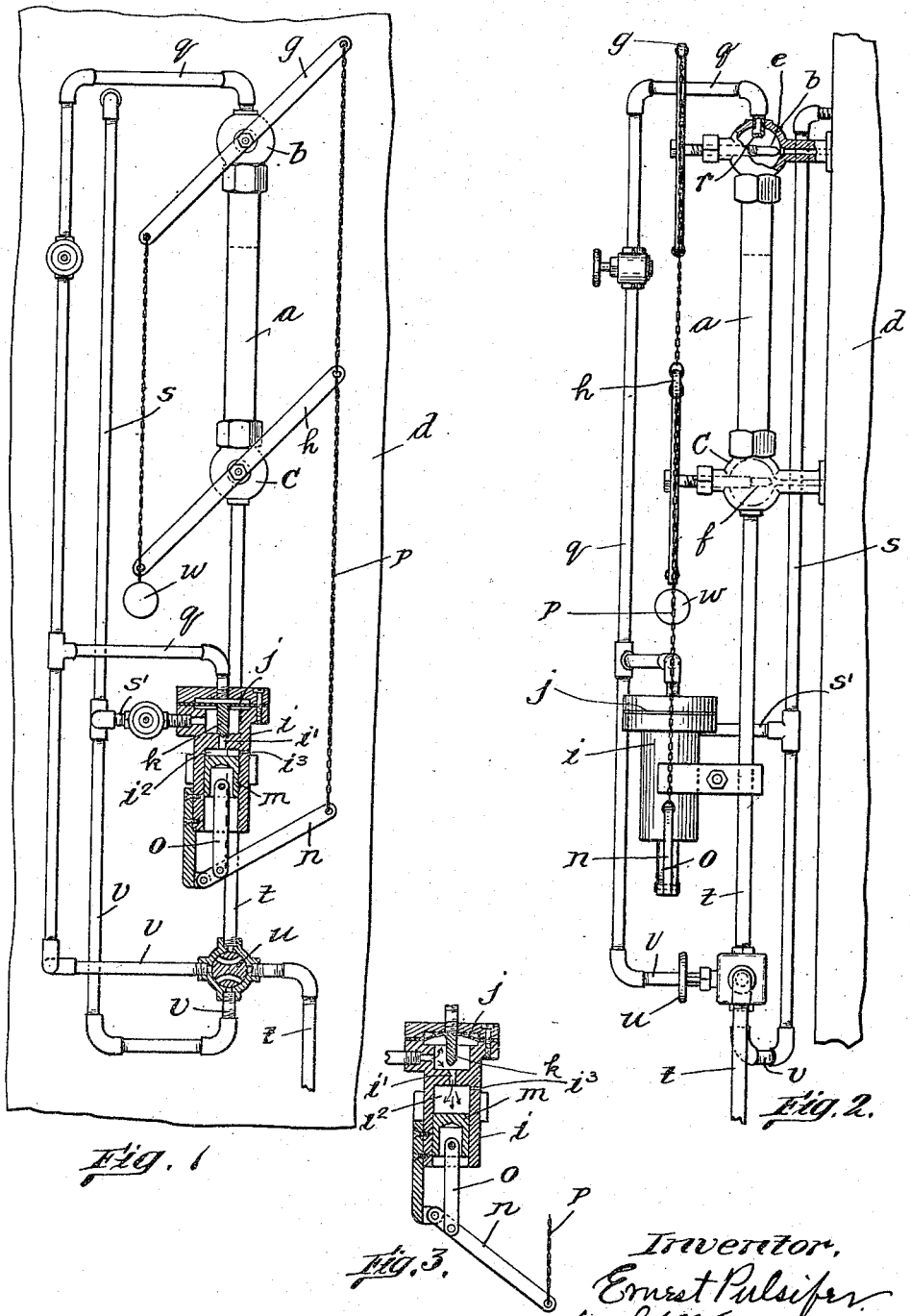

ERNEST PULSIFER, OF SALEM, MASSACHUSETTS.

WATER-GAGE SAFETY DEVICE.

1,364,410.     Specification of Letters Patent.     Patented Jan. 4, 1921.

Application filed November 19, 1918. Serial No. 263,117.

*To all whom it may concern:*

Be it known that I, ERNEST PULSIFER, a citizen of the United States, and a resident of Salem, county of Essex, State of Massachusetts, have invented an Improvement in Water-Gage Safety Devices, of which the following is a specification.

This invention relates to certain improvements in safety devices for the water gage glass of a steam boiler, which are designed to operate automatically to close communication between the boiler and gage glass, so that escape of steam and water will be prevented, in case the gage glass should be broken.

Prior to my invention various devices for this purpose have been produced, a common form being a check valve device, which is closed by the flow of steam or water through the connections, but in many States, use of such devices is prohibited on account of their liability to close, or obstruct these passages at times other than when the gage glass becomes broken, so that it will not register the water level correctly. Other automatic devices for this purpose depend on the maintenance of pressure between the gage cocks and the gage glass to hold the means for automatically closing said cocks in inoperative position, and it is to this specific class of devices to which this invention more particularly relates, and which it is the special purpose of this invention to improve.

It is desirable, at times, to "blow off" the gage glass, as in case of foaming of the boiler and for other reasons, this usually being done by opening a valve at the bottom of the gage glass, so that a rush of steam therethrough is permitted, and with prior devices for automatically closing the gage glass connections; so far as I am aware the automatic means will be caused to operate if it is attempted to "blow off" the gage glass when the parts are in normal position.

The objects of my invention are to provide an automatically operating device of the character above described which is of simple construction and positive of operation, when the gage glass becomes broken, and will not operate at any other times, and to provide a device of this character which will permit the gage glass to be blown off without being caused to operate to close the gage cocks.

I accomplish these objects by the means shown in the accompanying drawings in which—

Figure 1 is a front elevation, partly in section, of an embodiment of my invention.

Fig. 2 is a side elevation thereof and

Fig. 3 is a detail sectional view of the pressure operated device.

As shown in the drawing, the gage glass $a$ is indicated as supported in the usual manner by fittings $b$ and $c$ at top and bottom, said fittings being connected to the boiler $d$ above and below the normal water line in the usual manner. Said fittings $b$ and $c$ are provided with valves $e$ and $f$ respectively, which are arranged to engage seats in the boiler connections. Operating arms $g$ and $h$ are connected to the stems of said valves $e$ and $f$, respectively, the arrangement being such that movement of said arms through approximately 45° will move said valves between their open and closed positions.

According to my invention, I provide a casing $i$ having a chamber therein, in which a diaphragm $j$ is located and a valve $k$ is connected to the under side of said diaphragm and is arranged to close a passage $i'$ leading from said chamber beneath the diaphragm to a piston chamber $i^2$ formed in the casing and in which a piston $m$ is provided, said piston being connected to a lever $n$ by an intermediate link or piston rod $o$, said lever $n$ being also connected to the valve operating arms $g$ and $h$ by a chain $p$, so that movement of said lever $n$ downward will cause the valves $e$ and $f$ to be simultaneously closed. The piston chamber $i^2$ is provided with a small leak opening $i^3$ as shown.

A pipe $q$ is connected to the upper fitting $b$ at the upper side thereof, and is extended therefrom and connected to the chamber of the casing $i$ above the diaphragm $j$, so that the latter is normally subjected to boiler pressure. The pipe $q$ is formed with a right angle elbow $r$ at its point of connection with the fitting $b$, arranged so that said pipe opens toward the opposite side of the fitting from that at which the pipe, connecting the boiler and said fitting, enters the latter. A pipe $s$ is connected to the steam space in the boiler, and a branch pipe $s'$ is connected thereto and to the casing $i$ beneath the diaphragm $j$, so that both sides of the latter are normally subjected to boiler pressure, but, as the area acted on at the under side is less than that at the upper side, by the area of the seating portion of the valve $k$, the pressure on the upper side of the diaphragm $j$ will normally be greatest and will hold the valve $k$ seated.

A blow-off-pipe $t$ is connected to the under side of the lower fitting $c$ and the passage therethrough is controlled by a valve $u$ arranged therein. The valve $u$ is of the turning-plug type and is provided with two pairs of ports and two separate passages, combining two separate valves in one structure. Adjacent portions of the pipe $t$ are connected to one pair of said ports, and opposite portions of a pipe $v$ are connected to the other pair thereof, the ends of the pipe $v$ being respectively connected to the pipe $s$ leading directly from the boiler, and to the pipe $q$, adjacent its point of connection with the casing $i$. The arrangement is such that, when the valve $u$ is in its normal position, it will close both pipes $t$ and $v$, and when it is moved to open pipe $t$, it will also open pipe $v$.

As previously stated, under normal conditions, the pressure on the diaphragm $j$ holds the valve $k$ closed. If, however, the gage glass should be broken, the steam will immediately escape through the upper fitting $b$, so that boiler pressure in the pipe $q$ will no longer be maintained. Moreover, the rapid rush of steam past the elbow $r$ will cause a suction action in the pipe $q$, and facilitate the reduction of pressure therein, so that the pressure on the upper side of the diaphragm $j$ is almost instantly reduced. This does not, however, affect the pressure in the pipe $s$ leading to the underside of the diaphragm, so that the upward pressure thereagainst will immediately lift the same and open the valve $k$, permitting the steam to escape through passage $i'$, into the piston-chamber $i^2$, and force the piston $m$ downward, as shown in Fig. 3, thereby causing the lever $n$ to be forced down to an extent sufficient to close both valves $e$ and $f$, through its action on the chain $p$.

In case there should be a slight leakage past the valve $k$, under normal conditions, accumulation of pressure in the chamber $i^2$ is prevented, by means of the leak opening $i^3$, but the size of this opening is not sufficient to interfere with the operation of the device when the valve $k$ is actually lifted. The piston $m$ is also fitted to slide freely, so that there is no liability that its movement will be appreciably obstructed by friction. The provision of auxiliary means for controlling the operation of the piston $m$ is particularly advantageous over an arrangement in which said piston would be normally subjected to full boiler pressure, in that the necessity of having the piston steam-tight, and of having its piston-rod work through a stuffing-box, is avoided. The liability of having the working of the piston prevented by friction is therefore practically obviated.

While the piston $m$, and parts which it actuates, may be held in normal position by friction, as such an arrangement would be somewhat unreliable, a weight $w$ is attached to one of the valve arms, as $h$, to prevent all possibility of the parts moving to closed position by the action of gravity.

In case it is desired to "blow off" the gage glass, the parts being in the normal position of Fig. 1, the value $u$ will be opened, so that steam will be permitted to rush down through the glass and out through the pipe $t$. This action, would, however, cause the valves $e$ and $f$ to be automatically closed as above described, if it were not for the fact that, by opening the valve $u$ the passage of steam at full boiler pressure, is permitted from the pipe $s$, through the pipe $v$, into the pipe $q$, as fast as it will be withdrawn therefrom at the gage-glass, so that full pressure on the upper side of the diaphragm $j$ will be maintained, and the opening of the valve $k$ will be prevented.

The above described construction is adapted to be applied to any ordinary steam boiler, slight mechanical changes being made to suit circumstances.

I claim:—

1. In combination with a boiler having a water-gage-glass and gage cocks for controlling communication between each end of the gage glass and the boiler, an actuator for automatically causing said gage cocks to be closed when fluid pressure is supplied thereto, a pressure operated device, and means controlled thereby for supplying fluid pressure to said actuator, said device being normally actuated in one direction by fluid pressure supplied from points adjacent one end of the gage glass to cut off the fluid pressure supply to said actuator, adapted and arranged to be actuated in the opposite direction by direct boiler pressure, when the opposing pressure is relieved, to permit fluid pressure to be supplied to said actuator.

2. In combination with a boiler having a water-gage-glass and gage cocks for controlling communication between each end of the gage glass and the boiler, an actuator having a pressure chamber, connections between said actuator and said cocks for moving the latter to closed position when fluid pressure is supplied thereto, a pressure-operated device having a pressure chamber at opposite sides thereof, one in open communication with the gage glass adjacent one end thereof, and the other in open communication with the boiler, means to supply fluid pressure from the boiler to the pressure chamber of said actuator and a valve for controlling the same arranged to be held in closed position by said pressure-operated device when both of its pressure chambers are subjected to boiler pressure and to be moved to open position when the pressure in the chamber thereof, which is connected to the gage glass is reduced.

3. In combination with a boiler having a water gage glass and gage cocks for controlling communication with each end of the gage glass and the boiler, an actuator arranged to be operated to move said cocks to closed position, an operating device for said actuator having a pressure chamber normally in open communication with the boiler at a point between one of said gage cocks and the gage glass to hold said operating device in inoperative position, a blow-off valve for said gage glass, and means operated by said blow-off valve as it is moved to open position to open direct communication between the boiler and said pressure chamber and maintain the pressure in the latter at approximately boiler pressure while said valve is open.

4. In combinatiton with a boiler having a water-gage-glass and gage-cocks for controlling communication between each end of the gage-glass and the boiler, an actuator adapted and arranged to close said cocks when operated, a fluid pressure-operated device actuated in one direction by pressure supplied from points adjacent one end of the gage glass to hold said device in an inoperative position, and arranged to be actuated in the opposite direction by direct boiler pressure to operate said actuator when the opposing pressure is released, a blow-off pipe connected to the gage glass having a controlling valve, and means operated by said controlling valve, when opened, for holding said operating device in inoperative position by direct boiler pressure.

In testimony whereof, I have signed my name to this specification.

ERNEST PULSIFER.